Jan. 19, 1937.    G. A. BOUVIER ET AL    2,068,368
SECURING DEVICE
Filed Jan. 15, 1935
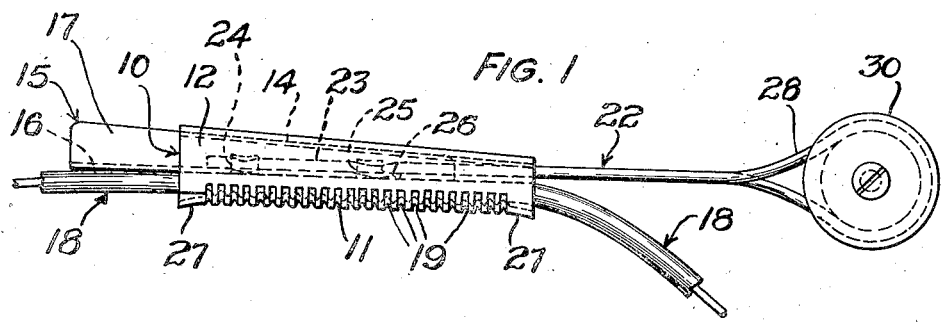
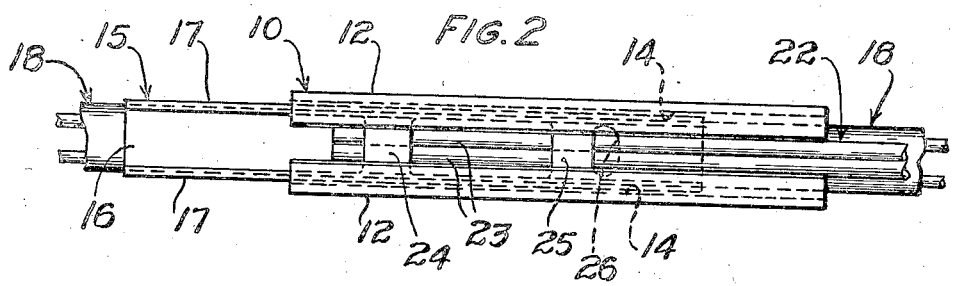
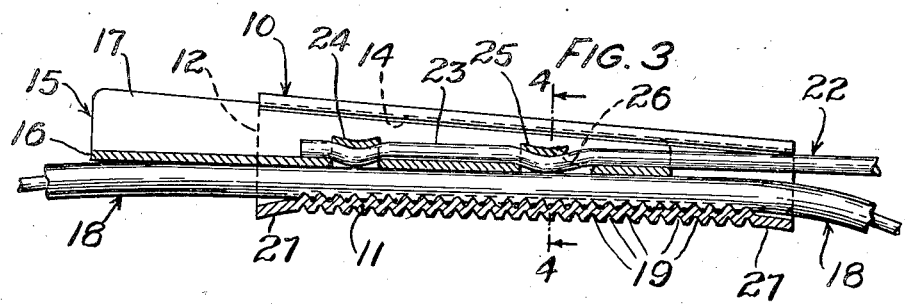
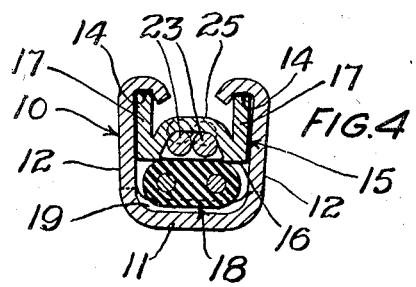
INVENTORS
G. A. BOUVIER
H. W. LARSON
BY H. A. Whitehorn
ATTORNEY Patented Jan. 19, 1937

2,068,368

UNITED STATES PATENT OFFICE 2,068,368

SECURING DEVICE

George A. Bouvier, Chicago, and Homer W. Larson, Downers Grove, Ill., assignors to Western Electric Company, Incorporated, New York, N. Y., a corporation of New York Application January 15, 1935, Serial No. 1,832

3 Claims. (Cl. 287—103)

This invention relates to securing devices, and more particularly to devices for supporting wires, especially those employed for securing electrical conductors to supports.

The primary object of this invention is to provide an efficient, durable and inexpensive securing device.

In accordance with the above object, one embodiment of the invention, as applied to the securing of electrical conductors to supports, contemplates a clamp comprising a sheet metal channel member with tapered sides having longitudinal edges inturned to form guide-ways for a second sheet metal channel member with tapered sides, this second member acting as a wedge to securely clamp between the base portions of the first and second channel members and in the trough formed by the first member an electrical conductor. A wire loop for securing the clamp to a support is attached to the base portion of the second channel member by inserting parallel ends thereof in loops struck upwardly from the base portion thereof, the loops then being staked into clamping relation with the wire ends. To prevent scoring or fracture of the wire ends adjacent that end of the wedge from which the looped wire extends and at which point flexing of the looped wire occurs while the clamp is in use the side of the loop adjacent the referred to end of the wedge and the base thereof is relieved or cut away to provide opposed offset vertical edges on the loop and the base. The loop in the outer end portion of the looped wire when the clamp is in use for securing a conductor to a support is hung around a porcelain knob.

The invention will be more fully understood by referring to the following detailed description, read in conjunction with the accompanying drawing forming a part thereof, in which Fig. 1 is a side view of a clamp embodying the features of this invention in use;

Fig. 2 is an enlarged fragmentary plan view thereof;

Fig. 3 is a longitudinal central vertical section of Fig. 2, and

Fig. 4 is an enlarged vertical section taken on the line 4—4 of Fig. 3.

Referring now to the drawing, the numeral 10 indicates a body member which is channel-shaped in cross-section and comprising a base 11 formed with slightly diverging side walls 12 which also are tapered toward one end to form a tapered trough-like structure, the edges of the side walls being turned inwardly and downwardly to form channels or guide-ways 14 for the reception of side walls of a wedge 15. The wedge 15 comprises a base 16 with slightly diverging and tapered side walls 17 which cooperate with the body 10, and like the body, the wedge is channel-shaped in cross-section. The tapered side walls 17 of the wedge 15 at their widest ends are of such a height that a desired clearance is permitted between the lower surface of the base 16 and the upper surface of the base 11 of the body 10 on which an insulated conductor 18 is seated to permit the body and wedge to be assembled in operating relation and thereafter to exert a clamping action on the wire when the wedge is drawn inwardly relative to the body. The base 11 of the body 10 is formed with corrugations 19 for the purpose of producing a greater coefficient of friction between the conductor 18 and the body than between the conductor and the wedge 15. These corrugations are not so pronounced as to materially damage the insulating covering of the conductor 18, but are effective in producing sufficient friction between the body 10 and the conductor.

Attached to the upper surface of the base 16 of the wedge 15 is a looped wire 22 having longitudinally abutting parallel end portions 23 inserted through spaced loops 24 and 25 struck upwardly from the base 16, the loops being staked by means of a suitable tool downwardly to bend the wire ends into the openings formed by the struck up loops and into clamping relation with the wire ends 23 so that no relative movement, particularly in a longitudinal direction, between the wire ends and the wedge can occur. The loop 25 which is formed adjacent that end of the wedge 15 from which the looped wire 22 extends and the wedge base 16 is relieved or cut away, as indicated at 26, at the side of the loop adjacent the referred to end of the wedge, thus providing offset vertical edges in the loop 25 and the base 16 of the wedge 15. This arrangement of opposed offset vertical edges in the loop 25 and the wedge base 16 serves to prevent the wire ends 23 from being bent sharply into the opening, thus preventing the wires from being scored or partially sheared at this point when the loop is staked. As shown in the drawing the cutaway 26 is formed only at one side of the loop 25 although in some cases it may be found desirable to offset for a certain distance the vertical edges of the loop 25 and the base 16 at the side opposite thereto. Although in the form shown a slight scoring of the wire ends 23 may occur at the opposite side of the loop 25 and also at both sides of the loop 24 this is not particularly deleterious since at these points no movement between the wire ends and the wedge occurs which tends to fracture the wires. In other words, there may be considerable weakening or even partial fracture of the wire at the three bends remote from the external loop and still the wire will have sufficient strength to withstand the longitudinal pull of a substantial length conductor, for example, between a telephone or power line pole and a residence.

At each end of the base 11 of the body 10 an outwardly flared portion 27 is preferably formed, which portions serve to effect a gradual release of the clamping pressure exerted on the conductor 18 seated within the body between the upper and lower surfaces of the bases of the body and the wedge 15 and thus prevent any sharp bend or cutting of the insulating covering of the conductor at the points where they leave the clamp.

In use after the conductor is clamped between the body 10 and the wedge 15, which clamping action is believed to have been made clearly obvious hereinbefore, a loop 23 (Fig. 1) formed at the outer end portion of the looped wire 22 is hung around a support such as a porcelain knob 30, which in turn is attached to a main support, such as a pole or masonry walls (not shown).

The clamp comprising the body 10 and the wedge 15 in use cooperate in such a manner that in the case of an increased load applied to the supported conductor there results an increased clamping action of the clamp on the conductor and the securing of the looped wire 22 to the wedge by staking provides a simple and expeditious method of clamping these members together and one which provides a maximum holding power which is very necessary, due to varying loads to which the conductor 18 may be subjected. Also by providing the relief or cutaway 26 between the loop 25 and the base 10 of the wedge 15 to offset the vertical edges thereof for the purpose previously described the life of the looped wire 22, which in use is being constantly flexed in a plurality of directions at this point due to the swaying of the conductor 18 between the support and the opposite support at its outer end (not shown), is materially lengthened.

From the above description it will be understood that the invention provides a simple and inexpensive device for supporting flexible members which may be readily and conveniently manufactured with a minimum amount of skill and manual labor. It is obvious, of course, that the invention is not limited to the specific embodiment or application thereof herein illustrated and described, except insofar as is defined by the appended claims.

What is claimed is:

1. In a device for supporting a conductor against longitudinal pull, a sheet metal member and a wire extending from the member for attachment to a support, the member having a struck up portion forming a loop extending across an opening formed in striking up the loop, the attaching wire passing under the loop and being secured in place by being bent into the opening under the loop, the side of the loop in the direction where longitudinal pulling forces are exerted on the wire being offset with respect to the corresponding side of the opening in a direction along the wire to permit a bend in the wire having a small angle with reference to the axis of the wire, the other side of the loop being substantially in alinement with the edge of the opening corresponding thereto so as to cause a sharp bend in the wire at this point.

2. A device for supporting a conductor against longitudinal strains comprising a clamp, said clamp having an opening therein, a loop on said clamp extending across and above said opening, and attaching means secured to said clamp for attachment to a support, said means having its inner end passed into the loop and secured to the clamp by staking downwardly the loop to displace said means into said opening, one side of the loop in the direction where longitudinal strains are exerted on the attaching means being offset with respect to the corresponding side of the opening in a direction across the loop to permit a free flexing of the attaching means adjacent its point of securement to the clamp, the other side of said loop being substantially in alinement with the corresponding side of the opening so as to cause a sharp bend of the attaching means at this point.

3. In a device for supporting a conductor against longitudinal strains, means for attachment to the conductor, said means comprising a sheet metal element, a wire for connecting said means to a support, said sheet metal element having a plurality of loops struck therefrom and said wire being secured between the loops and the sheet metal element, the successive edges of the loops being staked down to produce sharp bends in the wire except the first bend where the wire emerges from the element in the direction where longitudinal strains are exerted on the wire, said last mentioned bend having a relatively small angle with reference to the axis of the wire.

GEORGE A. BOUVIER.
HOMER W. LARSON.